123,096

UNITED STATES PATENT OFFICE.

EDWIN J. FRASER, OF SAN FRANCISCO, CALIFORNIA.

IMPROVEMENT IN SAVING FLOAT OR FINE GOLD, &c.

Specification forming part of Letters Patent No. 123,096, dated January 30, 1872.

SPECIFICATION.

*To all whom it may concern:*

Be it known that I, EDWIN J. FRASER, of the city and county of San Francisco and State of California, have invented Improvements in Saving the Precious Metals; and I do hereby declare the following description and accompanying drawing are sufficient to enable any person skilled in the art or science to which it most nearly appertains to make and use my said invenion without further invention or experiment.

The nature of my invention is to provide an improved process and apparatus for saving the precious metals, more especially gold of that quality known as float or flour-gold, which, on account of its minute fineness, is held in suspension by the water, and is, at present, carried away and lost. My improvement consists, first, in the saturation of a filtering substance with mercury and then passing the stream of water which carries the minute particles of metal through this filterer, by which they are compelled to come in contact with the mercury and be arrested and amalgamated; and secondly, in consuming or otherwise destroying the filtering substance so as to leave the accumulated metals in a condition to be removed in a body and saved.

In order to explain my invention so that others will be able to understand its operations, reference is had to the accompanying specification.

For accomplishing the first part of my invention sponge or any other suitable filtering substance or material can be used.

In order to saturate the filtering material with mercury, various methods may be employed, such as exhausting the air from the filtering material in a closed vessel and then introducing the mercury so that it will be taken up through the body of the sponge or other filtering substance in a state of minute subdivision, or sifting the mercury upon the filtering substance and accomplishing a minute subdivision, and saturation by mechanical means; but I prefer to introduce the mercury into the filtering substance in the form of a vapor and allowing it to condense while thus incorporated, thus insuring a thorough and complete saturation. I then place the filtering substance thus prepared inside of a vessel, which is provided with a wire-gauze or other perforated bottom; and, if desired, a similar cover can be employed. This vessel I then place in a convenient position, either at the end of a sluice or otherwise, and pass the water, which is supposed to contain the fine particles of gold above mentioned, through it. The water, in passing through the filtering substance, will be compelled to pass through the numerous interstices of the filterer where the mercury is deposited, and its slow passage through the filterer, in connection with the ramifications through which it is compelled to pass in a state of minute subdivision, will insure the contact of the particles of suspended metal with the mercury, which will arrest their passage and amalgamate with the mercury. After the stream has been passed through the filter a sufficient length of time it is removed and the filtering substance placed in a retort or other closed vessel, which connects with a second like vessel. Heat is then applied and the mercury distilled into the second vessel, after which the heat is continued until the filtering material is consumed, leaving the metal in the bottom of the retort.

Acids may also be used for destroying the filtering material, after which the separation of the metals can be proceeded with in the ordinary way.

By this means I provide an extremely simple and effective device for saving float or flour-gold or other precious metals, and one which is attended with but little expense and trouble.

Having thus described my invention, what I claim, and desire to secure by Letters Patent, is—

1. The process above described for preparing a filtering substance or material, for the purpose specified.

2. The process above described for releasing the metals from the filtering material or substance.

3. The above-described process for saving floating particles of gold or other precious metals, the same consisting in saturating a filtering or porous material or substance with quicksilver, and, after passing the water through the filter, destroying the filtering substance for recovering the metals.

In witness whereof I have hereunto set my hand and seal.

EDWIN J. FRASER. [L. S.]

Witnesses:
A. T. DEWEY,
WM. GERLACH.